(12) United States Patent
Trossen

(10) Patent No.: US 11,736,905 B2
(45) Date of Patent: Aug. 22, 2023

(54) METHODS AND APPARATUS FOR LAYER-2 FORWARDING OF MULTICAST PACKETS

(71) Applicant: InterDigital Patent Holdings, Inc., Wilmington, DE (US)

(72) Inventor: Dirk Trossen, London (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 94 days.

(21) Appl. No.: 17/267,339

(22) PCT Filed: Aug. 16, 2019

(86) PCT No.: PCT/US2019/045237
§ 371 (c)(1),
(2) Date: Feb. 9, 2021

(87) PCT Pub. No.: WO2020/036768
PCT Pub. Date: Feb. 20, 2020

(65) Prior Publication Data
US 2021/0243568 A1   Aug. 5, 2021

Related U.S. Application Data

(60) Provisional application No. 62/718,331, filed on Aug. 13, 2018.

(51) Int. Cl.
*H04W 4/06* (2009.01)
*H04L 12/18* (2006.01)

(52) U.S. Cl.
CPC ............. *H04W 4/06* (2013.01); *H04L 12/189* (2013.01)

(58) Field of Classification Search
CPC ....... H04L 12/189; H04L 45/16; H04L 45/66; H04L 67/02; H04W 4/06; H04W 52/383
See application file for complete search history.

(56) References Cited

U.S. PATENT DOCUMENTS

2007/0140273 A1* 6/2007 Kubota ............... H04L 12/4645
370/401
2015/0058968 A1* 2/2015 Wang .................. H04L 63/0281
726/12

(Continued)

FOREIGN PATENT DOCUMENTS

| WO | WO 2016201411 A1 | 12/2016 |
| WO | WO 2018006042 A1 | 1/2018 |
| WO | WO 2019245911 A1 | 12/2019 |

OTHER PUBLICATIONS

Reed et al., "Stateless Multicast Switching in Software Defined Networks", 2016 IEEE International Conference on Communications (ICC), Kuala Lumpur, Malaysia, May 22, 2016, 7 pages.

(Continued)

*Primary Examiner* — Khaled M Kassim
*Assistant Examiner* — Kai Chang
(74) *Attorney, Agent, or Firm* — Yin Shao

(57) ABSTRACT

Methods and apparatus for Layer-2 forwarding of multicast packets are disclosed. In an example, a method implemented in a wireless transmit/receive unit (WTRU) for wireless communications includes receiving a first packet comprising a request for content available at the WTRU, determining at least one outstanding request for the same content, and determining multicast path information of the at least one outstanding request. The method further includes generating a second packet and setting a destination Medium Access Control (MAC) address to a broadcast (BC) MAC address in the second packet, adding a proxy rule identifier (PRID) corresponding to the request into a payload of the second packet, and forwarding the second packet to another WTRU.

17 Claims, 8 Drawing Sheets

(56) References Cited

U.S. PATENT DOCUMENTS

| | | | |
|---|---|---|---|
| 2017/0237660 A1 | 8/2017 | Trossen et al. | |
| 2018/0007116 A1 | 1/2018 | Trossen | |
| 2018/0019956 A1* | 1/2018 | Ravindran | H04L 47/806 |
| 2019/0007992 A1* | 1/2019 | Kim | H04W 76/27 |
| 2019/0253461 A1* | 8/2019 | Bykampadi | H04L 63/0209 |
| 2019/0306068 A1* | 10/2019 | Kiss | H04W 36/08 |
| 2019/0357011 A1* | 11/2019 | Edge | H04W 68/005 |
| 2020/0053165 A1* | 2/2020 | Li | H04L 67/141 |
| 2021/0051573 A1* | 2/2021 | Miklös | H04W 48/18 |

OTHER PUBLICATIONS

Anonymous, "New SID for Enhancements to the Service-Based 5G System Architecture", 3rd Generation Partnership Project (3GPP), 3GPP Work Item Description, Document: S2-182904, 3GPP TSG-SA WG2 Meeting #126, Montreal, Canada, Feb. 26, 2018, 4 pages.

Anonymous, "Technical Specification Group Core Network and Terminals, 5G System, Technical Realization of Service Based Architecture, Stage 3 (Release 15)", 3rd Generation Partnership Project, Document: 3GPP TS 29.500 V1.1.0, Apr. 2018, 23 pages.

Huawei et al., "Support for 5GLAN Communication Key Issue", 3GPP Tdoc S2-187554, 3GPP TSG-SA WG2 Meeting #128, Jul. 2-6, 2018, Vilnius, Lithuania, 4 pages.

Purkayashta, D. et al., "BIER Multicast Overlay for HTTP Respone", draft-purkayastha-bier-multicast-http-response-00.txt, Network Working Group, Internet Engineering Task Force, IETF, Jun. 29, 2018, 14 pages.

Anonymous, "Technical Specification Group Services and System Aspects, Feasibility Study on LAN Support in 5G (Release 16)", 3rd Generation Partnership Project, Document: 3GPP TR 22.821 v16.0.0 (Mar. 2018), Mar. 2018, 52 pages.

* cited by examiner

METHODS AND APPARATUS FOR LAYER-2 FORWARDING OF MULTICAST PACKETS

CROSS REFERENCE TO RELATED APPLICATION

This application is a U.S. national stage application filed under 35 U.S.C. 371 of International Application No. PCT/US2019/045237, filed Aug. 6, 2019, which is a non-provisional filing of, and claims priority to and the benefit of U.S. Provisional Patent Application No. 62/718,331, filed Aug. 13, 2018, the entire contents of each of which being hereby incorporated by reference as if fully set-forth herein in their respective entirety, for all purposes.

BACKGROUND

Mobile communications continue to evolve. A fifth generation may be referred to as 5G, which may implement an advanced wireless communications system called New Radio (NR). Embodiments disclosed herein generally relate to wireless communication systems such as a 5G-local area network (LAN) system. For example, one or more embodiments disclosed herein are related to methods and apparatus for Layer-2 forwarding of (e.g., ad-hoc) multicast packets for service requests or responses.

BRIEF DESCRIPTION OF THE DRAWINGS

A more detailed understanding may be had from the detailed description below, given by way of example in conjunction with the drawings appended hereto. Figures in the description, are examples. As such, the Figures and the detailed description are not to be considered limiting, and other equally effective examples are possible and likely. Furthermore, like reference numerals in the figures indicate like elements, and wherein.

DETAILED DESCRIPTION

Communications Networks and Devices

Figure 1A:
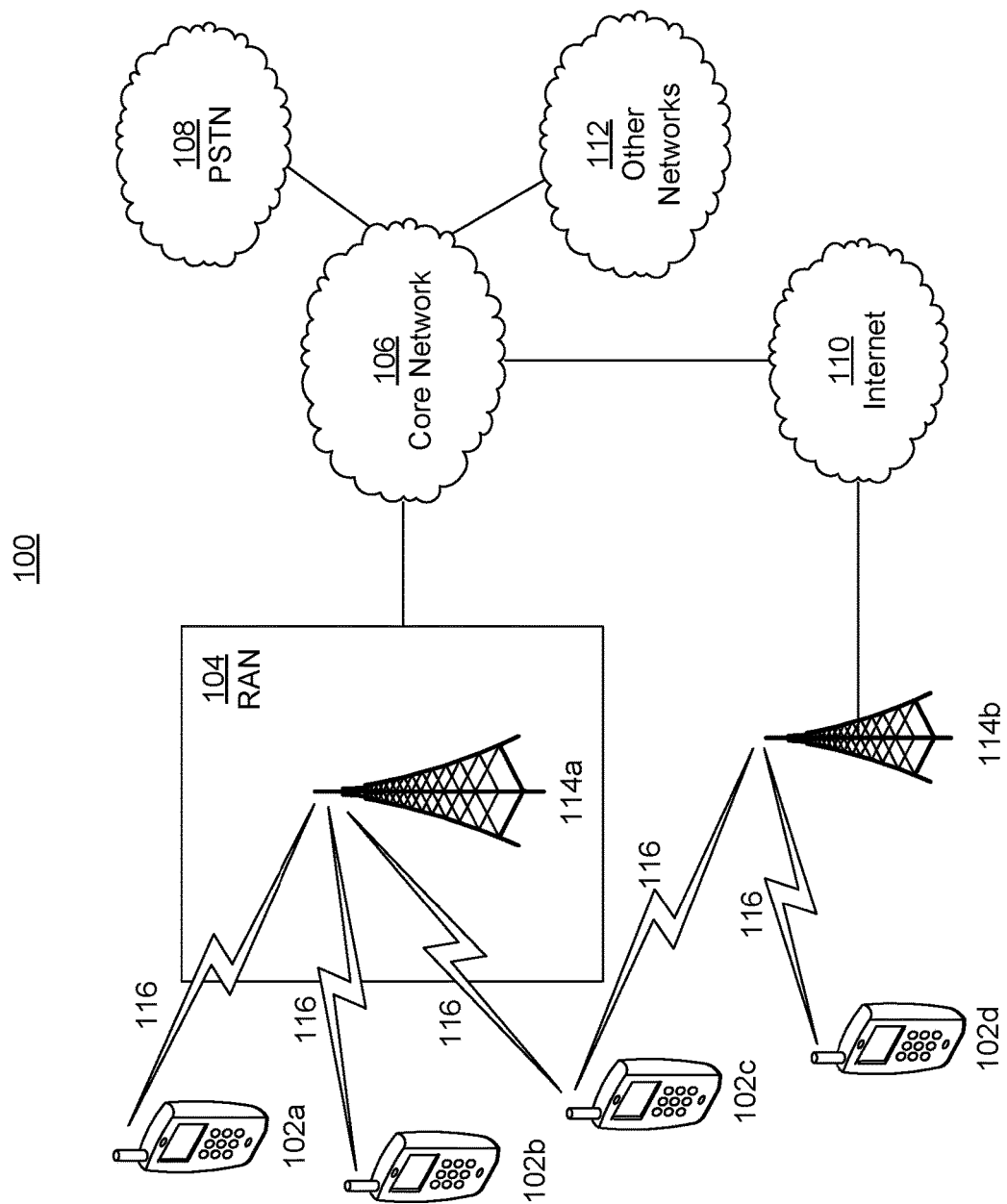
FIG. 1A is a system diagram illustrating an example of a communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (loT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a New Radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE), LTE-Advanced (LTE-A), and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, a Home Node B, a Home eNode B, or an access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
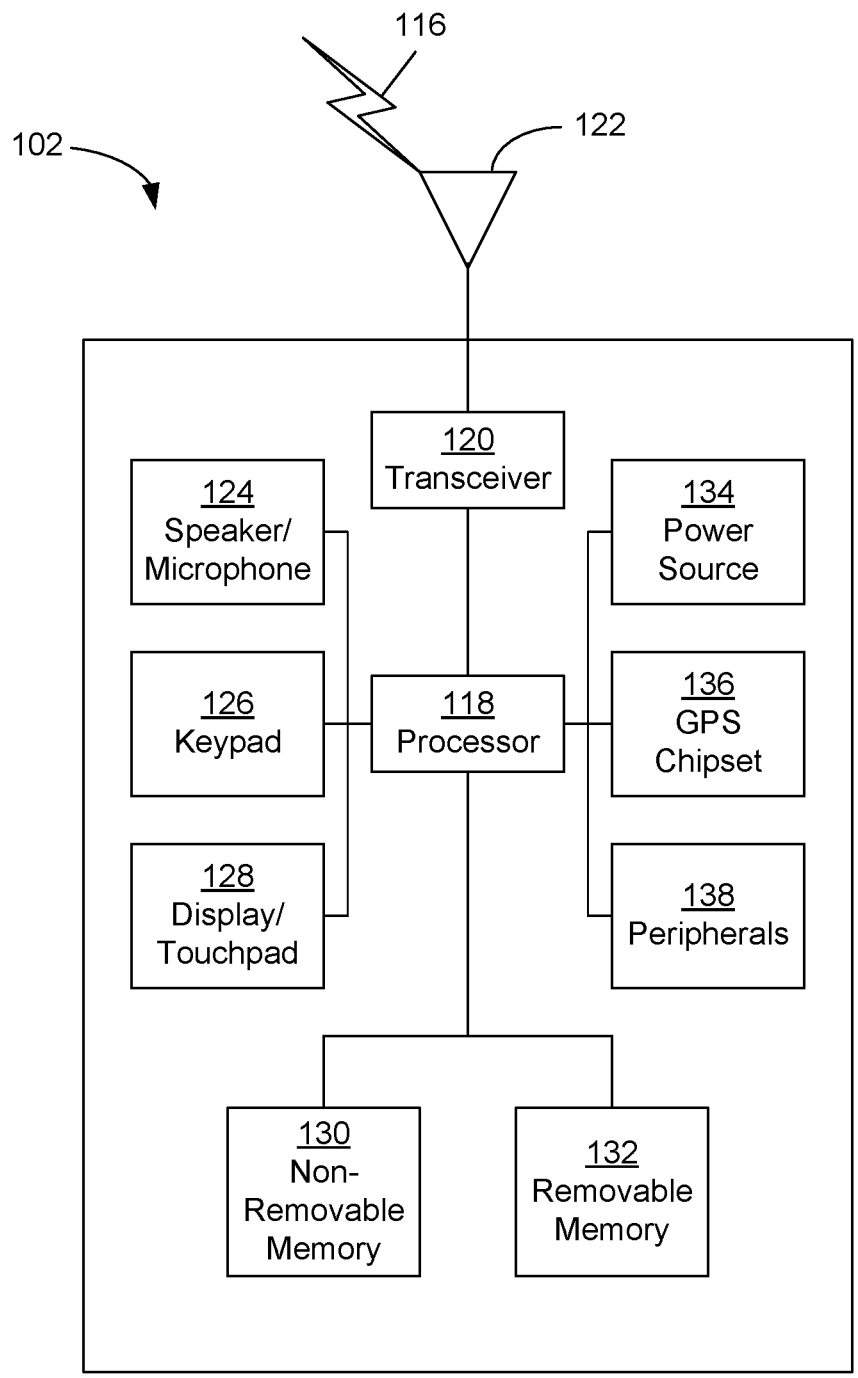
FIG. 1B is a system diagram illustrating an example of a wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
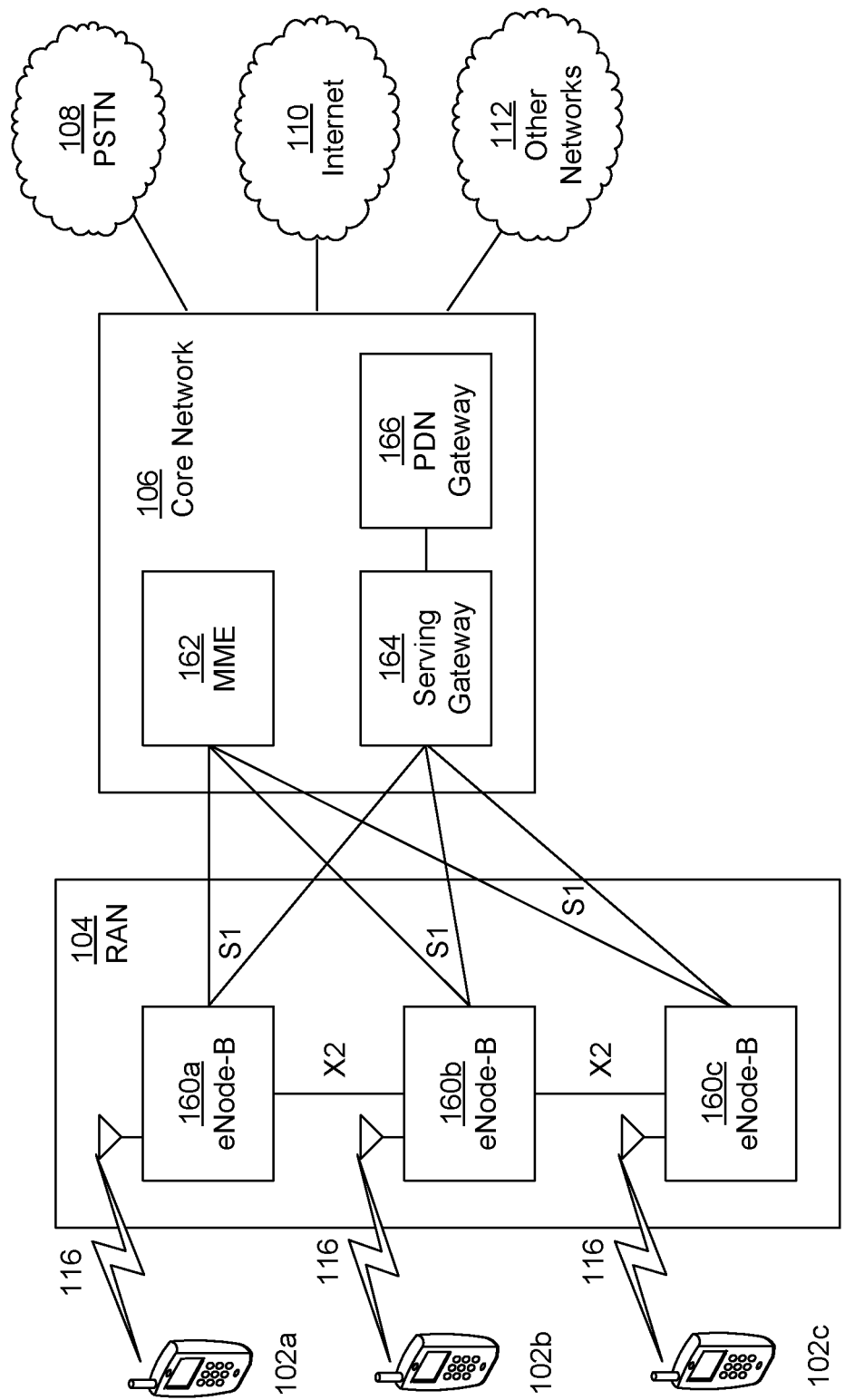
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In some representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
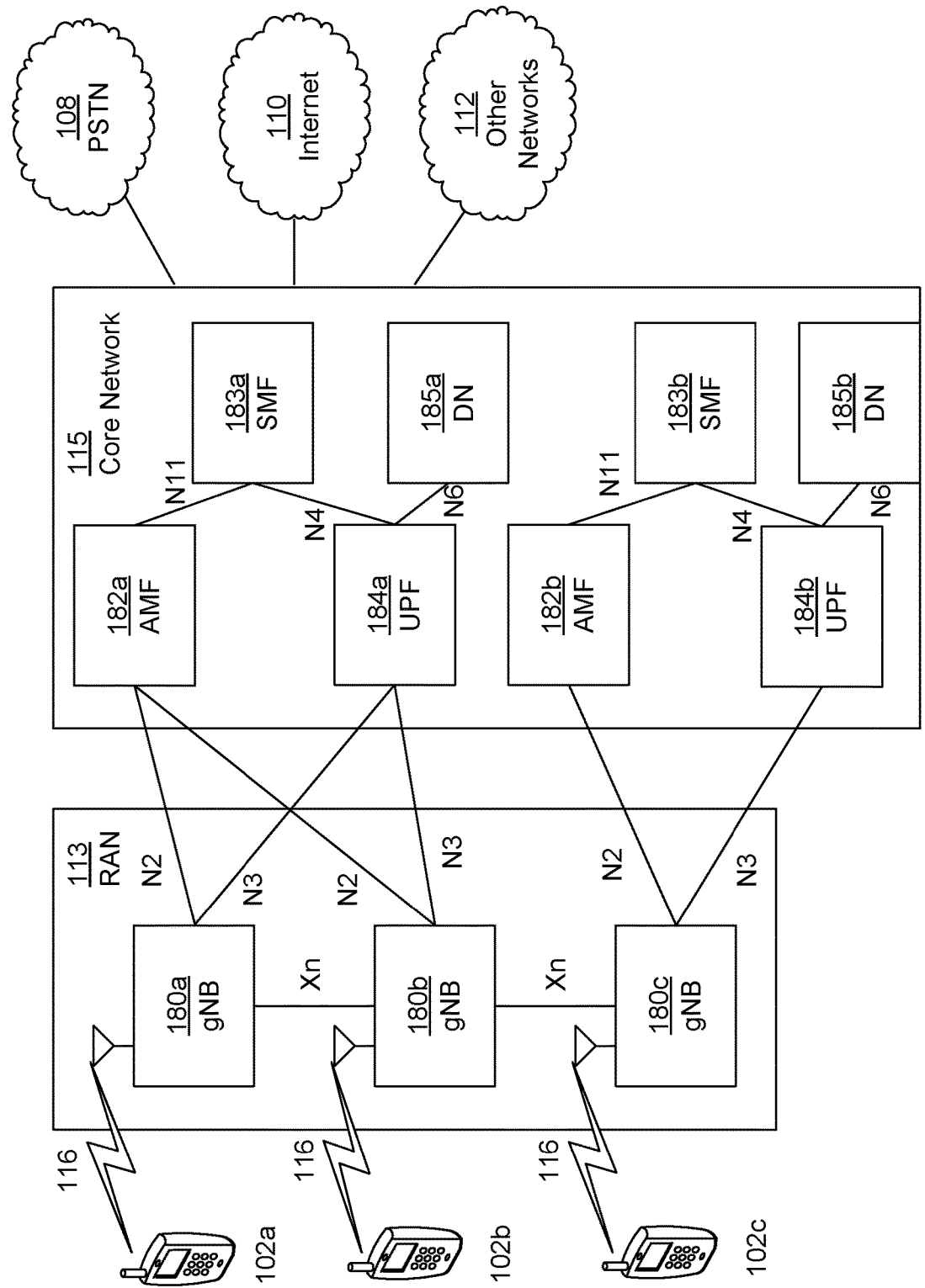
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating a WTRU or UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

User Plane Routing

User plane routing in mobile networks is a crucial function for delivering services to end users. In some conventional implementations, user plane routing in current mobile networks is realized through a combination of tunneling approaches of Internet Protocol (IP) packets toward the packet gateway of the enhanced packet core (EPC) for delivery to Internet-based services. In some examples, general IP and/or specifically HTTP-based services by virtue of utilizing information-centric networking (ICN) based approaches to routing may be implemented, for example, by using the methods or procedures as described in [1] and/or [2]. In some cases (e.g., the methods or procedures as described in [1] and/or [2]), the IP/HTTP packet delivery may be replaced by a publication of the packet to an ICN network, which in turn forwards the packet (e.g., after a suitable rendezvous and topology management process, see, for example, [1] and/or [2]) to a suitable service endpoint.

In some examples, methods and/or procedures (such as those described in [3]) may be utilized for ultimate forwarding of the (IP or HTTP) packet to the service endpoint. In some implementations, path-based forwarding, representing each link in the network with a specific bitposition in a fixed sized bitfield, may be utilized. In an example, at each incoming forwarder in the network, a binary AND/CMP check may be performed that compares each outgoing link of the forwarder (which in turn is designated to the aforementioned specific bitposition) with the bitpatterns included in the incoming packet. In an example, if said bitposition is set to 1, the packet is forwarded over the respective output port. These checks (e.g., one or more binary AND/CMP checks) may be performed for each output port of the traversing forwarder.

In some examples, the methods and/or procedures mentioned above (such as those described in [3]) may be implemented in one or more existing software defined networking (SDN) switches, utilizing the arbitrary wildcard matching capability of SDN switches. In an example, placing the bitpattern to be checked in each switch into IPv6 source and destination fields may provide suitable backward compatibility, while the simplicity of the binary check in each switch leads to a constant number of forwarding rules to be executed. In some cases, the number of rules equals the number of output ports in each switch.

In some implementations, path-based forwarding has a number of advantages, such as: (i) fast updates for service indirection (such as outlined in [4]) allow for fast redirection to new service instances; (ii) multicast capability simply by binary combining path information [5] with the potential for significant cost savings in virtual reality or HTTP-level streaming scenarios; and/or (iii) direct path mobility, eliminating the need for anchor-based mobility used in normal IP routing.

The 3GPP has started the adoption of service-based architecture (SBA) principles for the design of both control planes (CP) as well as user planes (UP) for 5G networks. See, e.g., [4] and [5]. In addition, the 3GPP work on (virtual private) LAN connectivity to user equipment (UE) (e.g., as outlined in [6]), are particularly aiming at a realization for SBA-based solutions for UP routing.

To counter the scalability problems of path-based forwarding [3], some methods or procedures (e.g., [7]) may combine pure Layer 2 link-local forwarding between WTRU(s) and 5G Access Nodes (5GANs) with path-based forwarding between 5GAN/UPF to achieve a WTRU-to-WTRU LAN-level connectivity. In some examples, combining Layer 2 link-local forwarding with path-based forwarding for HTTP/IP over ICN, IP-based services may be provided.

However, some current methods or procedures may only provide unicast connectivity (e.g., between two WTRUs), while one of the major advantages of path-based forwarding is the aforementioned multicast capability for scenarios such as quasi-synchronous HTTP-level streaming from many WTRUs to a single server.

In an example, at one or more 5GAN/UPF, one or more WTRUs may request the same resource(s) from an HTTP server (e.g., a video chunk of an HTTP-level streaming session). Some current methods or procedures may only provide the ability to transmit the HTTP response(s) to each WTRU individually, whereas path-based forwarding would allow for delivering a single response to all 5GAN/UPF functions (e.g., between which path-based forwarding is used). However, the last hop of link-local Layer 2 (L2) communication is not multicast enabled. In this case, multiple unicast transmissions (of the same content) are used and transmitted to each participating WTRU, which may pose an unnecessary burden on the link-local link (e.g., often a radio link).

Representative Procedure for Layer 2 Forwarding

In this disclosure, we disclose a packet format and various forwarding operations that enhance the WTRU-to-WTRU LAN forwarding by adding multicast capabilities (e.g., to address some issues mentioned in [1] and/or [2]), utilizing the advantages provided by path-based forwarding between each pair of 5GAN/UPF functions that are also on the link-local communication between a 5GAN/UPF and a WTRU.

In some examples, a 5GAN/UPF and/or WTRU may utilize a link-local LAN broadcast (e.g., via one or more broadcast messages) for the transmission of multicast HTTP responses, and the broadcast message(s) may be delivered, for instance, through the methods/operations outlined in [7]. In some examples, proxy rule identifiers (PRID) [8] are used to allow link-local WTRUs to associate received broadcast message(s) with outstanding requests that originated from the specific WTRU. A suitable packet format may be assembled in the server-facing service router (or a Network Attachment Point (NAP) in [2]) by constructing suitable 5G LAN forwarding information, while the filtering of broadcast messages is implemented in the client WTRUs. In some examples, the LAN level forwarding may use WTRU-to-WTRU forwarding based on unicast transmissions such as outlined in [7] and/or multicast transmissions as set forth herein. In the discussion below, for purposes of illustration, the LAN level forwarding is often described in the exemplary context of a realization using the methods and systems of outlined in [7] and seamlessly integrated with the methods and systems of [7]. However, it should be understood that this is merely exemplary, and that any WTRU-to-WTRU forwarding with a LAN-level broadcast capability may be used.

In some embodiments, procedures, methods, and architectures are provided for forwarding Layer 2 and/or Ethernet packets from one WTRU to one or more other WTRUs based on path-based forwarding (between 5G ANs/UPF combo nodes or standalone UPFs) for ad-hoc multicast transmission of HTTP-based service responses.

In some examples, procedures, methods, and architectures are provided to construct suitable packet frame format(s) for delivery of Layer 2 packets across UPFs. In an example, methods are provided for forwarding such packet frame format(s) from an originating WTRU over a first UPF and a second UPF to one or more destination WTRUs, which is achieved through suitably swapping information for link-local Layer 2 delivery at one or more traversing UPFs. In another example, utilization of forwarding in HTTP/IP-over-ICN use case for HTTP/IP communication over a 5G native L2 bearer is provided. In some cases, the WTRU-to-WTRU forwarding may be used or applied in Layer 2 and/or Layer 3.

Figure 2:
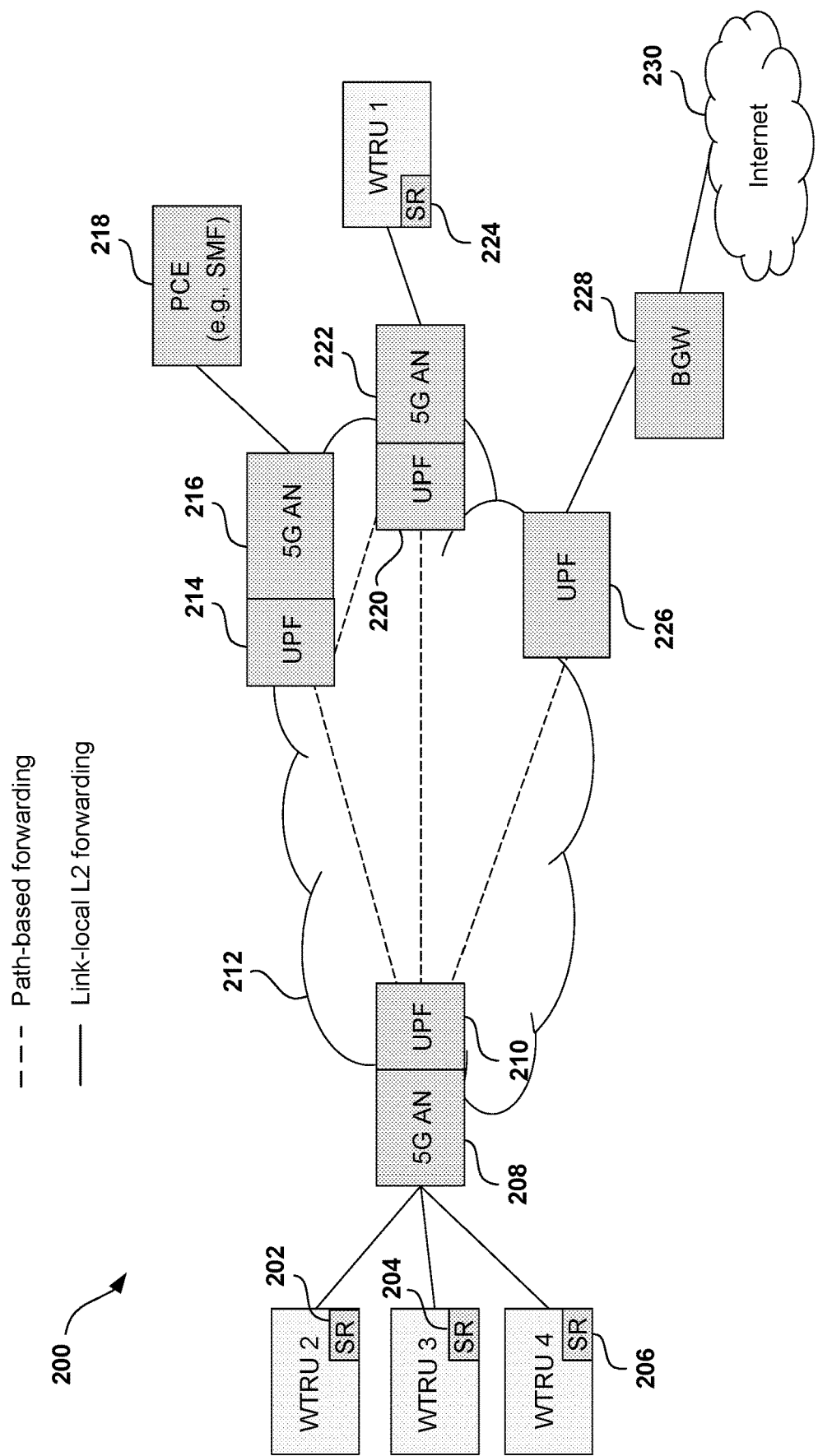
FIG. 2 is an example of system architecture for WTRU-to-WTRU forwarding with multicast capabilities, according to one or more embodiments.

Referring to FIG. 2, in an example, a network system 200 may be divided into path-based and link-local Layer 2 forwarding. Whereas [7] discloses a system with a UE-to-UE LAN bearer between one of more 5GANs, in this example, the availability of a pure L2 bearer is assumed between the WTRU and the UPF of the 5GAN to which the WTRU is attached. Also note that, although the architecture described herein is in the context of UPFs, the latter may be replaced by WiFi-compliant/UPF access nodes, which provide a Layer 2 bearer to attached (Layer 2) devices such as WTRU or WTRU. In addition, the method discussed herein may be utilized in WiFi-based radio environments with Layer 2 connectivity between the WiFi access points. In some cases, any WTRU-to-WTRU LAN based bearer may be used for multicast transmission schemes discussed herein if link-local LAN-level broadcast is supported by such bearer.

In the network system 200, for example, a path computation element (PCE) 218 is responsible for path computation between UPFs or access nodes (ANs) (e.g., 5G ANs). In one embodiment, the PCE 218 may be implemented in the SMF as shown in FIG. 2. The UPFs (e.g., UPF 210, UPF 214, UPF 220, and/or UPF 226) may realize one or more packet forwarding operations, for example, a suitable MAC swapping operation toward a 5G AN (e.g., AN 208, AN 216, and/or AN 222) and/or a path-based forwarding operation toward one or more UPFs (e.g., UPF 210, UPF 214, UPF 220, and/or UPF 226). In some cases, the PCE 218 may either be connected via its own UPF (e.g., UPF 214), or the PCE 218 may be located in a mobile device (e.g., a 5G AN connected mobile device) connected via a 5G AN (e.g., an AN 216/UPF 214 combination. The latter is illustrated in FIG. 2. In another example, the PCE 218 may be located in a WTRU (e.g., WTRU 1) in the network system 200.

In various embodiments, the possible connection to Internet 230, when utilizing methods such as those in [1] and/or [2] for HTTP/IP services, is shown through a suitable function that is similar to that of a Packet Gateway (PGW) in a mobile core 5G network, namely, a border gateway (BGW). In an example, a BGW 228 may be connected directly to the path-based forwarding network through a UPF (e.g., its own UPF 226), while the BGW 228 utilizes the methods outlined in [1] and/or [2] for the transfer of IP/HTTP packets. In some cases, the BGW 228 may be not a WTRU-like device, but a network component akin to an IP-level router.

In various embodiments, each WTRU may implement one or more WTRU-to-WTRU forwarding schemes (e.g., the methods/schemes in [1] or [2]) in a service router (SR) sub-component. In an example, the SR sub-component (interchangeable to a SR component) may represent the NAP, albeit co-located with a WTRU. In the network system 200, for example, SR components (or SR sub-components) 224, 202, 204, 206 are located in WTRU 1, WTRU 2, WTRU 3, and WTRU 4, respectively.

Still referring to FIG. 2, WTRU 1 may be considered as a serving endpoint (e.g., a server), while at least one of WTRU 2, WTRU 3, and/or WTRU 4 may be initiating client(s) of HTTP request(s) (e.g., HTTP request(s) toward the serving endpoint WTRU 1). In an example, at least one of the WTRU 2, WTRU 3, and/or WTRU 4 has issued/sent an HTTP request to a resource (e.g., foo.com/video.mpg), wherein WTRU 1 provides services under a fully qualified domain name (FQDN) (e.g., foo.com). In an example, using methods in [2] and the WTRU-to-WTRU forwarding in [7], the HTTP request is sent to WTRU 1. As will be described below in detail, the response may be sent back in a manner that the link-local transmission may be realized as a multicast to more than one WTRU. For instance, WTRU 2 and WTRU 3 may have requested said resource quasi-simultaneously, while WTRU 4 has not issued a request.

Resources outside network 212, e.g., in the Internet 230, also may be requested in accordance with some embodiments. In such a case, the request may be sent to a BGW component (e.g., the BGW 228 as shown in FIG. 2), which in turn applies the methods of [1][2], acting as the SR sub-component of the serving endpoint to which the HTTP request is sent. In other words, the BGW implements the same methods as the SR sub-component of the WTRU 1, but for any uniform resource locator (URL) that is located outside of the network.

Representative Packet Frame Format

Figure 3:
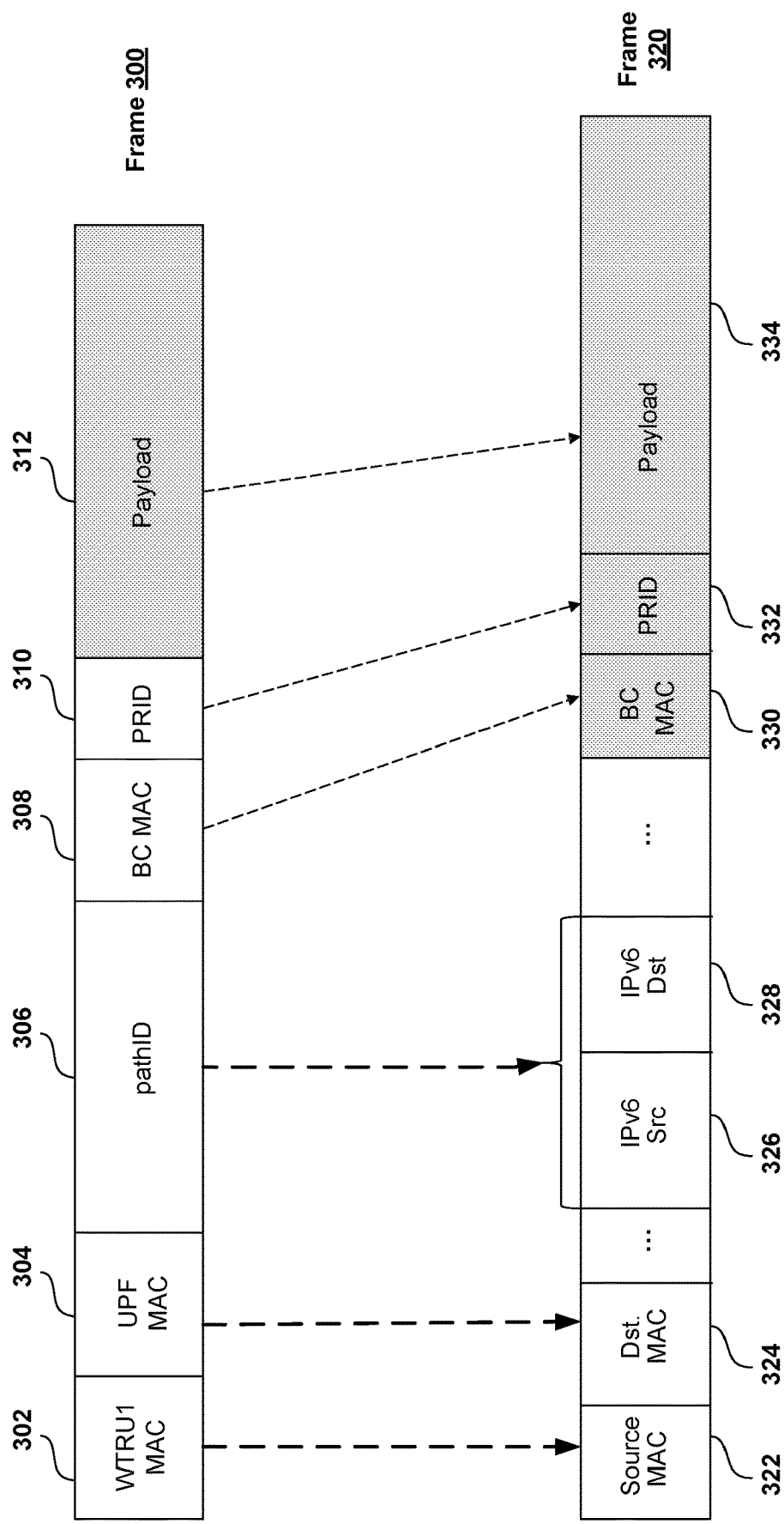
FIG. 3 is a diagram illustrating a first packet format and a second packet format used for WTRU-to-WTRU forwarding, according to one or more embodiments.

FIG. 3 shows a packet frame format that may be used for the forwarding method in accordance with embodiments (e.g., extending the frame format in [7]). The example in FIG. 3 shows a frame 300 (e.g., having a general frame format) for the traffic from a source WTRU (e.g., WTRU 1 in FIG. 2) to destination-local broadcast, while a general frame format in [7] may be used for traffic from the originating client (e.g., WTRU 2 in FIG. 2) to the serving endpoint (e.g., WTRU 1).

In FIG. 3, the frame 300 at the top has a generic frame format, which may comprise any of:

- WTRU1 MAC (field 302): the L2 MAC address of the originating WTRU (e.g., L2 MAC address of WTRU 1 in FIG. 2);
- UPF MAC (field 304): the L2 MAC address of the receiving UPF (e.g., L2 MAC address of UPF 220 in FIG. 2);
- pathID (field 306): the bit field-based path information (see, e.g., [3]) from a source UPF to a destination UPF (e.g., from UPF 220 to UPF 210 in FIG. 2);
- BC MAC (field 308): the L2 MAC address utilized for link-local broadcast (BC), e.g., ff:ff:ff:ff:ff:ff in Ethernet. Alternatively, an assigned link-local multicast address may be used for the broadcast functionality, allowing for differentiating the procedures described herein from already implemented broadcast functionality;
- PRID (field 310): the so-called proxy rule identifier (PRID), uniquely identifying the initiating HTTP service request. In an example, a PRID may be formed through a hash over suitable HTTP request parameters, such as uniform resource identifier (URI) and URL-specific HTTP header entries at the initiating client. For example, [8] outlines how to distribute the suitable knowledge of the URL-specific hash input parameters to participating NAPs (e.g., SRs in the architecture in FIG. 2) and how to utilize the PRID in the publication to the ICN; and
- Payload (field 312): the payload of the Ethernet frame. In an example, when utilizing the methods in [1] or [2], the payload may include the content ID (CID) and reverse content ID (rCID) derived from an incoming HTTP request together with the actual HTTP request payload. In addition, according to [8], the payload will include the PRID formed by the SR of the initiating client. In another example, the CID may be the IP address assigned to the WTRU 2 with the payload being the IP packet at the WTRU 1.

The lower part of FIG. 3 shows one exemplary manner in which the frame 300 (having a L2 frame format shown at the top of FIG. 3) may be mapped onto a frame 320 (e.g., an Ethernet frame). In this embodiment, the MAC address(es) (e.g., the WTRU1 MAC in field 302) are mapped onto the source MAC (field 322)/destination MAC (field 324) information in the frame 320 while the path ID 306 utilizes the IPv6 source (field 326)/destination (field 328) fields for the path-based forwarding. The destination MAC address (e.g., BC MAC in field 308) and/or the PRID (in field 310) is transferred as part of the payload of frame 320, together with the payload (in field 312) of the format 300. Alternatively, for example, the BC MAC may be represented by a simple flag, which causes the receiving UPF to utilize the well-known BC MAC for link-local transmission.

Representative Procedure for Path Computation

In some examples, path computation may be used for WTRU-to-WTRU forwarding (see, e.g., the methods in [7]). In an example, the reverse path for HTTP responses may be determined (or identified) by utilizing the same pathID used in the forward direction (e.g., for the incoming HTTP request) (see, e.g., the methods in [9]). As such, in some cases, a separate path computation may not be needed for the HTTP response.

Representative Procedure for Ad-hoc Multicast Group Formation and Forwarding

As stated above in connection with FIG. 2, in an example, the methods of [2] (which may also extend to the methods outlined in [9]) may be implemented in the source WTRU (e.g., WTRU 1 in FIG. 2, or a serving WTRU). In addition, the destination or initiating client WTRUs (e.g., at least one of WTRU 2, WTRU 3, and WTRU 4 in FIG. 2) may determine (e.g., using the methods outlined in [8]) a PRID as a unique identification of the HTTP request(s). In some examples, the PRID may be communicated (e.g., using the methods of [8]) as part of the HTTP-over-ICN realization (see, e.g., [2] or [8]), and transmitted in the payload of the WTRU-to-WTRU forwarded packet (e.g., using the methods in [7]).

Figure 4:
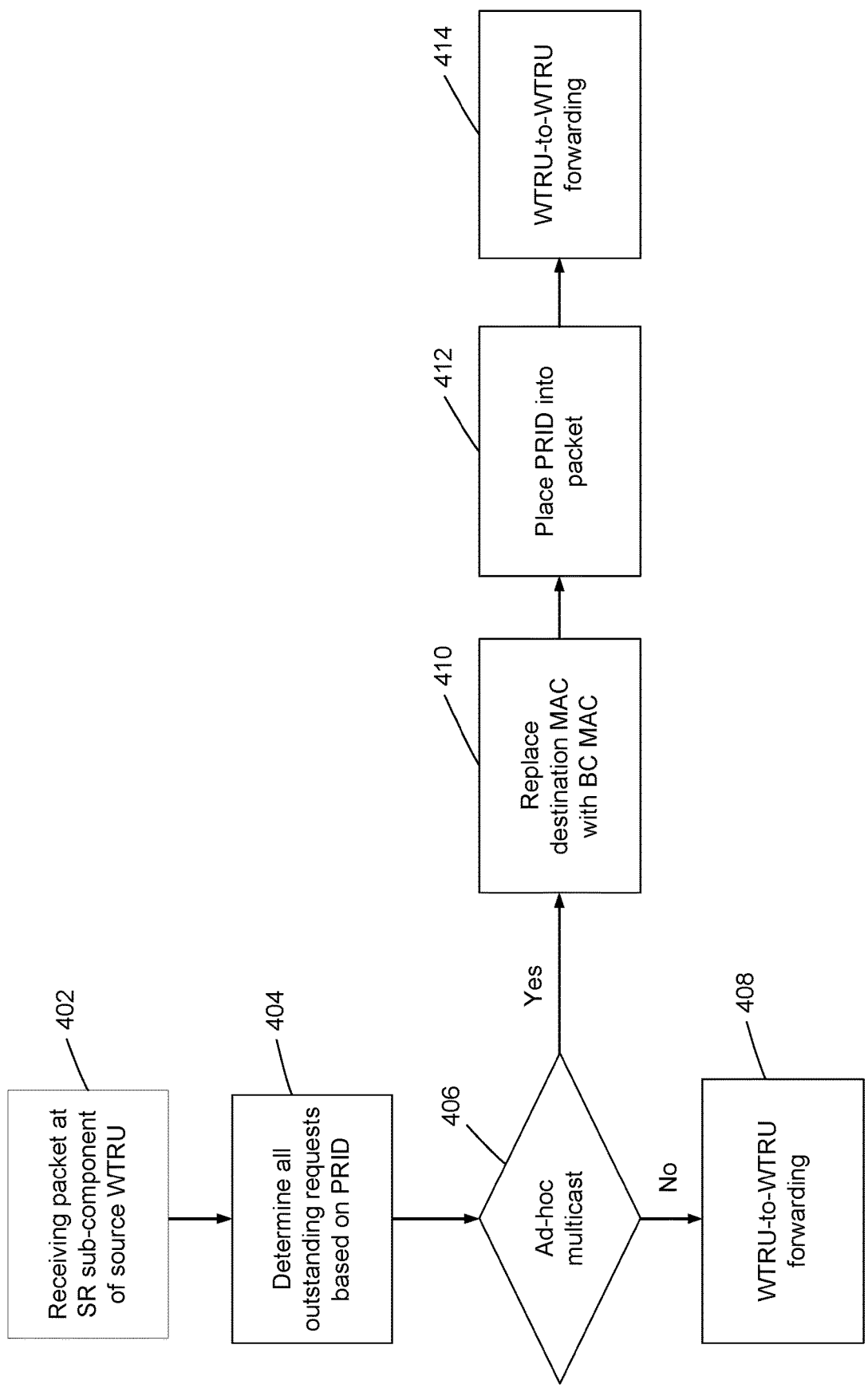
FIG. 4 is a flowchart of an example of operations for ad-hoc multicast group formation at a source WTRU, according to one or more embodiments.

FIG. 4 is a flowchart showing one or more operations in the source WTRU (WTRU 1) according to an embodiment. At block 402, the source WTRU generates an HTTP response to an HTTP request received from an initiating WTRU (e.g., any of WTRU2, WTRU 3, and/or WTRU 3 in FIG. 2). Then at block 404, the source WTRU's SR sub-component may determine or identify one or more outstanding client requests (e.g., all outstanding client requests) associated with the same request(s) that triggered or generated the response in block/step 402. This may be realized through the association of a PRID with a specific request, assuming that the SR sub-component keeps track of ongoing requests through their respective PRIDs.

At block 406, the source WTRU (or the SR sub-component of the source WTRU) may determine the number of outstanding request(s) from one or more clients (e.g., destination or initiating client WTRUs) and determine whether a multicast transmission is to be performed. If there is only one outstanding client request, flow proceeds to block 408, in which the procedure in [7] may be used directly by swapping destination (or client) and/or source (or serving) MAC addresses for the response packet, and forwarding the response to the initiating (or destination) WTRU.

If more than one client request is outstanding, on the other hand, flow proceeds to block 410, where the SR sub-component may determine the multicast pathID to all 5GAN/UPF functions through a binary OR of all pathIDs of outstanding client requests and set the destination MAC address to the broadcast (BC) MAC address. In an example, the SR sub-component may replace the destination MAC address with the BC MAC address. At block 412, the SR sub-component may place the PRID of the request into the payload of the packet, together with the actual payload. The SR sub-component then, at block 414, forwards the packet to the destination WTRU (e.g., according to the WTRU-to-WTRU forwarding procedures in [7]), utilizing the pathID (s) formed in block 410.

The forwarding procedure of [7] is exemplary. In some cases, if another method for WTRU-to-WTRU forwarding is used, the SR sub-component forwards the packet according to the other method, and in some implementations, without executing the pathID(s) mentioned above. In an example, the SR sub-component may set the destination MAC address to the BC MAC address, or replace the destination MAC address with the BC MAC address, without executing the pathID(s) mentioned above.

In some examples, the SR may send more than one packet since the HTTP payload is likely segmented according to L2 segmentation techniques. In all those Layer 2 packets, a general format (e.g., as shown in the frame 300 in FIG. 3) is used, and the PRID may be included in all those Layer 2 packets.

Representative Procedure for Link-Local Packet Reception

In various embodiments, using the L2 WTRU-to-WTRU forwarding scheme discussed herein, an Ad-hoc multicast response is sent to all 5GAN/UPF functions where client WTRUs of the ad-hoc multicast group are located, achieved through the combination of all individual pathID information of the original request forward paths into a single (multicast) pathID for the response. In some examples (e.g., according to [7]), the 5GAN may link locally forward the L2 packet according to the destination MAC address. With the operations in FIG. 4, this MAC address is the link-local broadcast address, e.g., ff:ff:ff:ff:ff:ff in Ethernet, or alternatively a specially assigned Ethernet multicast address.

In some embodiments, each WTRU may be configured to listen to packets sent to this address and will therefore retrieve the received packet with the format(s) outlined in FIG. 3. Furthermore, in some cases, each received $L_2$ packet may be sent to the WTRU-internal SR sub-component for inspection.

Figure 5:
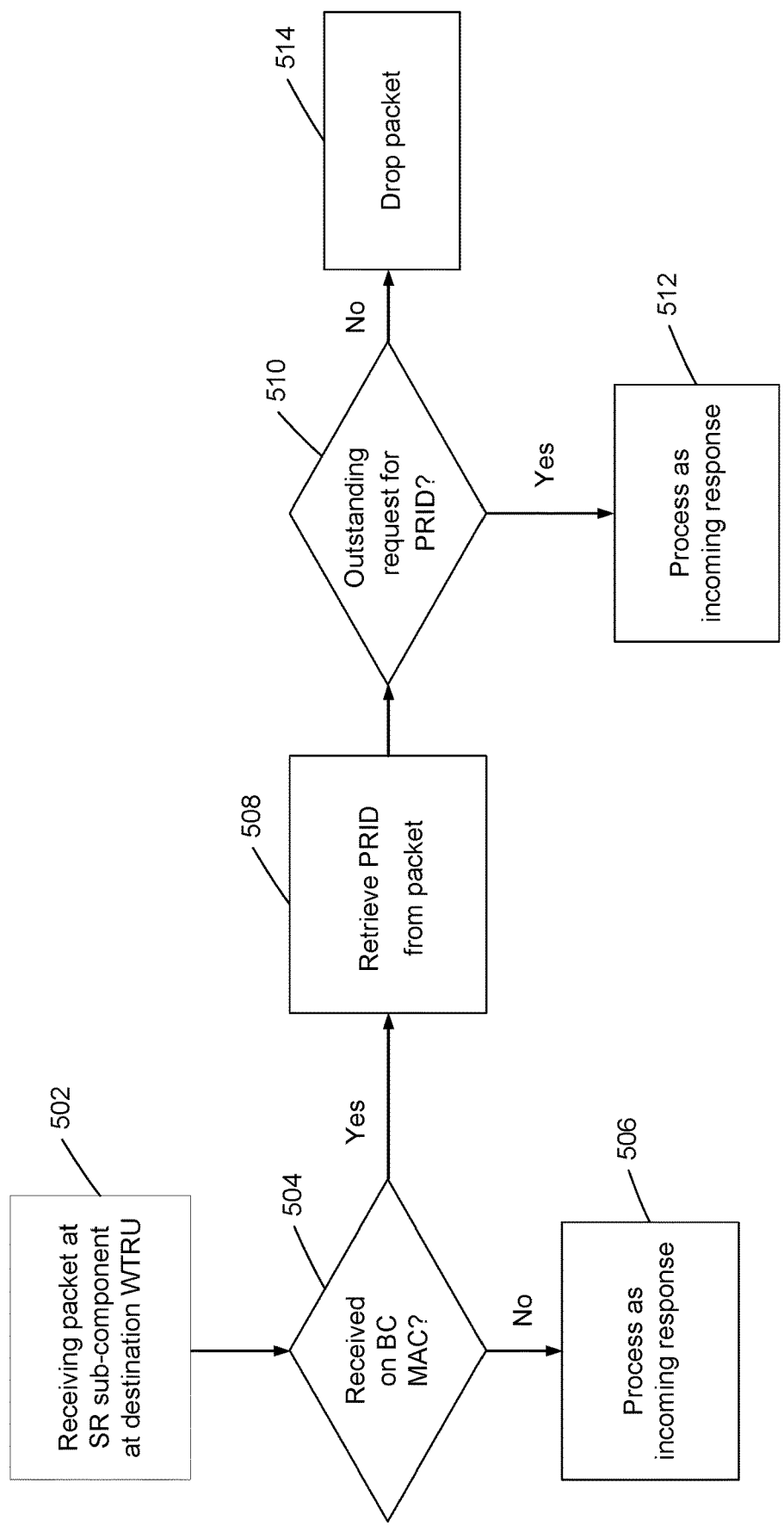
FIG. 5 is a flowchart of an example of operations for link-local packet reception at a destination WTRU, according to one or more embodiments.

FIG. 5 is a flowchart illustrating the operations at the SR sub-component of destination WTRUs (e.g., WTRUs 2 and 3 in FIG. 2) in accordance with an embodiment. First, at block 502, the SR sub-component of the destination (or initiating) WTRU determines that a packet has been received, and at block 504, the SR sub-component checks whether the packet is destined to the WTRU MAC (e.g., based on a general format (e.g., as shown in the frame 300 in FIG. 3), or based on whether the packet is received with a BC MAC address). If the packet is determined to be a unicast packet, then, at block 506, the packet is processed as an incoming response (e.g., re-assembled into a full HTTP response, if necessary, and eventually forwarded to the respective local IP-based application), according to, for example, the methods outlined in [2].

If, on the other hand, the packet is destined for the broadcast MAC address, the flow instead proceeds to block 508, where the SR sub-component retrieves the PRID from the payload. At block 510, the SR sub-component determines whether there is any outstanding request associated with the PRID. For example, the SR sub-component may keep track of all outstanding requests that it has transmitted in association with the corresponding PRID that uniquely identifies the request together with suitable information to forward the HTTP response locally to the IP-based application initiating the original request). If there is any outstanding request associated with the PRID, flow proceeds to block 512, where the SR component may handle the packet according to [2] and/or [8]. If, on the other hand, it is determined in block 510 that there is no outstanding corresponding PRID (e.g., the packet is not associated with any outstanding request that originated from the WTRU), flow instead proceeds to block 514, where the packet may be dropped.

In some embodiments, packet reception may be optimized to reduce unnecessary inspection of incoming (e.g., broadcast) packets. In one embodiment, for instance, the incoming network interface of the WTRU may only listen to broadcast messages if there are any outstanding requests (e.g., HTTP requests) at all. In this case, the SR may signal to the network interface that such requests are outstanding. In some cases, however, the suppression of handling broadcast messages may conflict with other procedures implemented in the WTRU, e.g., for route solicitation or similar operations, and the realization of this optimization may depend on the interaction with those other procedures.

In some examples, if methods other than [7] are used for WTRU-to-WTRU forwarding, a LAN-based broadcast bearer may lead to the same starting point of FIG. 5.

Each of the following references is incorporated by reference herein: [1] U.S. Patent Application Publication No. 2018/0007116; [2] U.S. Patent Application Publication No. 2017/0237660; [3] Stateless multicast switching in software defined networks, Martin J. Reed, Mays Al-Naday, Nikolaos Thomos, Dirk Trossen, George Petropoulos, Spiros Spirou, In proceedings of ICC 2016, Kuala Lumpur, Malaysia, 2016; [4] 3GPP TS 29.500 "5G System; Technical Realization of Service Based Architecture; Stage 3"; [5] 3GPP Study Item Description: S2-182904, "New SID for Enhancements to the Service-Based 5G System Architecture"; [6] 3GPP TR 22.821 V16.0.0 (2018-03) Feasibility Study on LAN Support in 5G; [7] U.S. Provisional Patent Application No. 62/688,699; [8] PCT Publication No. WO 2018/006042; and [9] PCT Publication No. WO 2016/201411.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of (or interchangeable with) any UE or mobile device recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for wireless communications, comprising:
receiving, by a first wireless transmit/receive unit (WTRU) from a second WTRU, a packet comprising a response associated with an Internet Protocol (IP)-based application;
determining, by the first WTRU, that the packet is received on a broadcast (BC) Medium Access Control (MAC) address;
retrieving, by the first WTRU, a proxy rule identifier (PRID) from the packet in response to the determination that the packet is received on the BC MAC address, wherein the PRID is associated with the IP-based application;
on condition that there is no outstanding request associated with the PRID, dropping, by the first WTRU, the packet; and
on condition that there are two or more outstanding requests associated with the PRID, forwarding, by the first WTRU, the response locally to the IP-based application that initiated the two or more outstanding requests.

2. The method of claim 1, wherein any of the first WTRU and the second WTRU is associated with a 5G Access Node (5GAN).

3. The method of claim 1, wherein any of the first WTRU and the second WTRU is associated with a User Plane Function (UPF).

4. The method of claim 1, wherein the two or more outstanding requests were sent from one or more WTRUs other than the first WTRU and the second WTRU.

5. The method of claim 1, wherein the packet is received from a multicasting transmission.

6. The method of claim 1, wherein the response is a Hypertext Transfer Protocol (HTTP) response.

7. A first wireless transmit/receive unit (WTRU) comprising:
a receiver configured to receive a first packet comprising a request for content available at the WTRU;
a processor communicatively coupled with the receiver, the processor configured to:
determine two or more outstanding requests for the same content,
determine multicast path information of the two or more outstanding requests,
generate a second packet,
set a destination Medium Access Control (MAC) address to a broadcast (BC) MAC address in the second packet, and
add a proxy rule identifier (PRID) corresponding to the request into a payload of the second packet; and
a transmitter communicatively coupled with the receiver and the processor, the transmitter configured to send the second packet to a second WTRU.

8. The first WTRU of claim 7, wherein the processor is further configured to identify, via a Service Request (SR) component of the first WTRU, a Hypertext Transfer Protocol (HTTP) response corresponding to the request.

9. The first WTRU of claim 8, wherein the processor is further configured to generate the second packet for multicasting in response to receiving the request and identifying the HTTP response.

10. The first WTRU of claim 7, wherein the multicast path information includes a path identifier (pathID).

11. The first WTRU of claim 7, wherein the payload of the second packet further includes the requested content.

12. A first wireless transmit/receive unit (WTRU) comprising:
a receiver configured to receive, from a second WTRU, a packet comprising a response associated with an Internet Protocol (IP)-based application;
a processor communicatively coupled with the receiver, the processor configured to:
determine that the packet is received on a broadcast (BC) Medium Access Control (MAC) address,
retrieve a proxy rule identifier (PRID) from the packet in response to the determination that the packet is received on the BC MAC address, wherein the PRID is associated with the IP-based application, and
on condition that there is no outstanding request associated with the PRID, drop the packet; and
a transmitter communicatively coupled with the receiver and the processor, the transmitter configured to:
on condition that there are two or more outstanding requests associated with the PRID, send the response locally to the IP-based application that initiated the two or more outstanding requests.

13. The first WTRU of claim 12, wherein any of the first WTRU and the second WTRU is associated with a 5G Access Node (5GAN).

14. The first WTRU of claim 12, wherein any of the first WTRU and the second WTRU is associated with a User Plane Function (UPF).

15. The first WTRU of claim 12, wherein the two or more outstanding requests were sent from one or more WTRUs other than the first WTRU and the second WTRU.

16. The first WTRU of claim 12, wherein the packet is received from a multicasting transmission.

17. The first WTRU of claim 12, wherein the response is a Hypertext Transfer Protocol (HTTP) response.

* * * * *